Sept. 4, 1962  H. W. SCHMITZ ETAL  3,052,492
WINDSHIELD WIPER ARM ATTACHMENT
Filed Dec. 29, 1960  2 Sheets-Sheet 1

INVENTORS
HARRY W. SCHMITZ
EUGENE R. ZIEGLER
BY W. E. Finken
THEIR ATTORNEY

Sept. 4, 1962 H. W. SCHMITZ ETAL 3,052,492
WINDSHIELD WIPER ARM ATTACHMENT
Filed Dec. 29, 1960 2 Sheets-Sheet 2
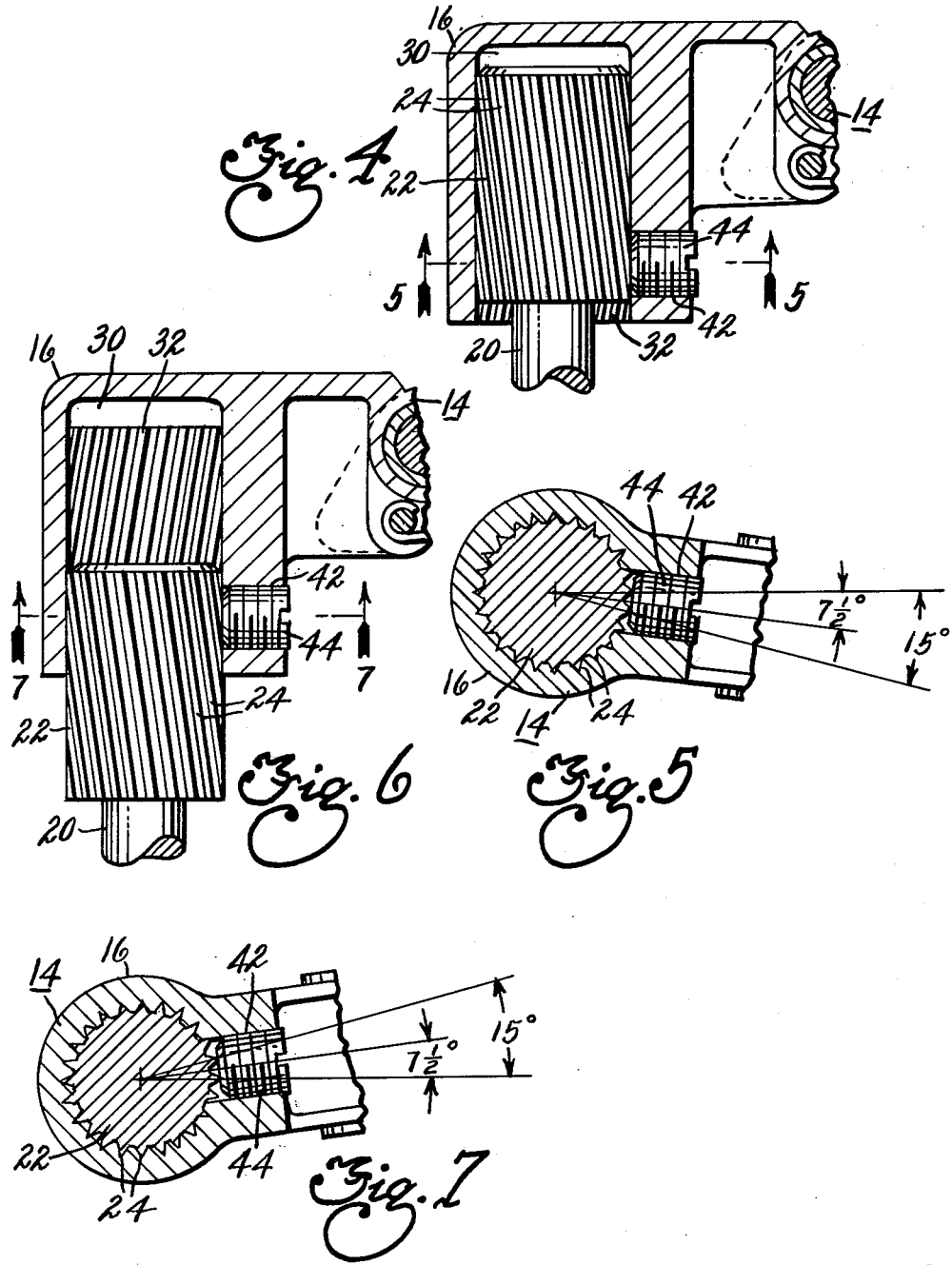
INVENTORS
HARRY W. SCHMITZ
EUGENE R. ZIEGLER
BY W. E. Finken
THEIR ATTORNEY United States Patent Office 3,052,492
Patented Sept. 4, 1962

3,052,492
WINDSHIELD WIPER ARM ATTACHMENT
Harry W. Schmitz, Camillus, and Eugene R. Ziegler, Spencerport, N.Y., assignors to General Motors Corporation, Detroit, Mich., a corporation of Delaware
Filed Dec. 29, 1960, Ser. No. 79,338
6 Claims. (Cl. 287—53)

This invention pertains to windshield wipers, and particularly to improved means for attaching a wiper arm to a wiper shaft permitting infinite angular adjustment therebetween.

Windshield wiper arm to shaft attachments wherein the shaft has a straight knurled head, or spindle, attached thereto and the wiper arm includes a head section having a complementary internally knurled socket, have been extensively commercially used. While this type of wiper arm to shaft attachment has been generally satisfactory, its one disadvantage relates to the fact that the arm can only be angularly adjusted relative to the shaft in increments determined by the angular spacing between the complementary knurls. As a practical matter, it has been found that the smallest angular space between the complementary straight knurls is approximately 4½° due to the fact that the diameter of the mating parts must necessarily be rather small.

The present invention relates to an improved wiper arm to shaft connection including complementary knurled wiper arm and shaft parts in which the arm is infinitely angularly adjustable relative to the shaft. Accordingly, among our objects are the provision of infinitely angularly adjustable attachment means for interconnecting a wiper arm and a shaft; the further provision of helical means interconnecting a wiper arm and a wiper shaft so as to permit infinite angular adjustment therebetween; and the still further provision of a wiper arm to shaft attachment comprising a helically knurled head, and a complementary helically knurled socket which is axially movable relative thereto to vary the relative angular position of the arm and the shaft including means for locking the parts in their adjusted position.

The aforementioned and other objects are accomplished in the present invention by embodying helical knurls on the complementary parts having a helix angle, or pitch, sufficient to facilitate infinite angular adjustment between the two parts. Specifically, the improved attachment means is designed for use with a windshield wiper arm having an inner, or head, section with a socket recess. The actuating, or pivot, shaft has an axially elongate head attached thereto having external helical knurls. The knurls are circumferentially spaced apart by a 15° angle as disclosed herein. However, it is to be understood that the angular spacing between the knurls is only exemplary and is not to be construed as a limitation.

The pitch of the helical knurls is chosen so that opposite ends of each knurl are displaced angular distances greater than the angle between adjacent knurls. The socket of the head section is formed with complementary internal helical knurls such that when the head section is engaged with the spindle, relative axial movement therebetween will vary the angular position of the head section relative to the shaft. Since the pitch of the helical knurls is such that the wiper arm can be angularly adjusted relative to the shaft through an infinite number of angular positions within the angular spacing between each knurl, it is apparent that by first engaging the wiper arm so that the wiper arm is in the approximately desired angular position, the angular position of the arm can be precisely adjusted so that the wiper blades carried by the wiper arms will firmly engage the lower reveal molding of the windshield when they are in their parked positions.

In order to maintain the arms in their adjusted angular positions, locking means are carried by the head section of the wiper arm, these locking means comprising a set screw engageable with the knurled head of the shaft for precluding relative axial movement between the wiper arm and the wiper shaft.

Further objects and advantages of the present invention will be apparent from the following description, reference being had to the accompanying drawings, wherein a preferred embodiment of the present invention is clearly shown.

In the drawings:

FIGURE 4 is a fragmentary view similar to FIGURE 2 depicting the improved attachment means with the wiper arm in the extreme inner position.

FIGURE 5 is a sectional view taken along line 5—5 of FIGURE 4.

FIGURE 6 is a fragmentary view similar to FIGURE 4 depicting the wiper arm in its extreme outer position.

FIGURE 7 is a sectional view taken along line 7—7 of FIGURE 6.

Figure 1:
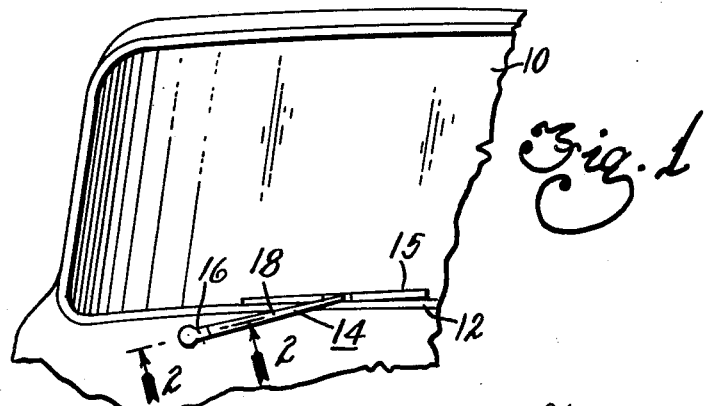
FIGURE 1 is a fragmentary view of a portion of a vehicle having a wiper arm with the improved attachment means of this invention.

With particular reference to FIGURE 1, a portion of a vehicle is shown including a windshield 10 having a lower reveal molding 12 and an oscillatory wiper blade and arm assembly comprising an arm 14 and a blade 15. In accordance with conventional practice, the wiper arm 14 includes spring hinge connected inner and outer sections 16 and 18, the inner, or head, section being attached to a pivot, or actuating, shaft. The wiper blade 15 carried by the wiper arm 14 is designed for oscillatory movement across the outer surface of the windshield 10, and when the wiper motor is inactivated, the wiper blade 15 is designed to firmly engage the lower reveal molding 12 so as to be out of the driver's range of vision.

Figure 2:
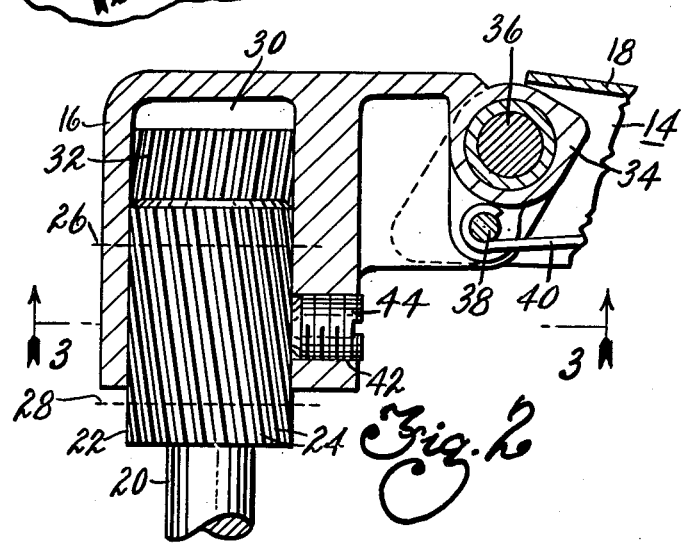
FIGURE 2 is a fragmentary view, partly in section and partly in elevation, of the improved attachment means in the "centered" position.
Figure 3:
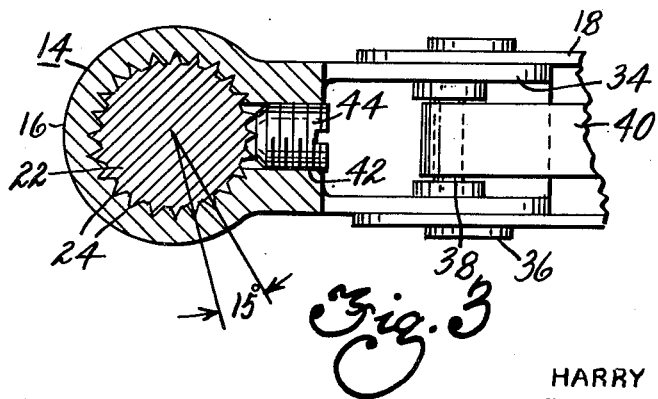
FIGURE 3 is a sectional view taken along line 3—3 of FIGURE 2.

With reference to FIGURES 2 and 3, the wiper arm 14 is drivingly connected to a pivot shaft 20 having a head, or spindle, 22 attached to its outer end. The head 22 is axially elongate and is formed with external helical knurls 24. By way of example, as seen in FIGURE 3, the knurls 24 are angularly spaced 15° apart. The helix angle of the knurls 24 is chosen such that the angle between the upper and lower ends of each knurl is greater than 15°, this being done to assure that the wiper arm will be drivingly connected with the wiper shaft in its extreme outer position, to be described hereinafter. As shown in FIGURE 2, the pitch of the helical knurls 24 is such that the angular space between each knurl is equal to the angle between any two adjacent knurls between the dotted lines 26 and 28 which are disposed inwardly of the ends of the spindle 22.

The head section 16 of the wiper arm is formed with an internal socket 30 having complementary internal helical knurls 32 having the same pitch and same angular spacing as the knurls 24 on the spindle 22. The head section 16 is formed with a radial extension 34 supporting a hinge pin 36 for pivotally connecting the outer section 18 to the head section 16. In addition, the radial extension 34 includes a lug, or pin, 38 for supporting one end of a spring 40, the other end of which is suitably connected to the outer arm section 18 and biases the outer arm section about the hinge 36 to apply pressure to the wiper blade 15 and maintain it in engagement with the windshield 10.

In addition, the head section 16 is formed with a threaded opening 42 which intersects the socket recess 30. A set screw 44 is received in the threaded opening 42, the inner end of which is adapted to engage the spindle 22 so as to preclude relative axial movement between the head section 16 and the spindle 22 when the wiper arm has been adjusted to the desired angular position. In FIGURES 2 and 3, the head section 16 and the spindle 22 are in their "centered" position. When the set screw 44 is loosened, the head section 16 can be moved axially inward or outward thereby imparting angular movement to the wiper arm relative to the shaft 20 in opposite directions.

As seen in FIGURES 4 and 5, the head section 16 of the wiper arm is in its extreme inner position, wherein the wiper arm has been moved through an angle of 7½° in the clockwise direction from the position of FIGURE 3 to the position of FIGURE 5. In FIGURES 6 and 7, the head section 16 is located in its extreme outer position wherein the wiper arm has been angularly adjusted through an angle of 7½° in the counterclockwise direction from the position of FIGURE 3 to the position of FIGURE 7. If it is desired to adjust the angular position of the wiper arm throughout an increment of more than 15°, the head section 16 must be entirely removed from the spindle 22 and reengaged therewith at a different angular position. The elongate spindle 22 enables the requisite driving connection to be obtained between the shaft and the wiper arm at an infinite number of relative angular positions within the angle between the knurls on the spindle 22. Moreover, once the wiper arm has been angularly adjusted relative to the shaft to the desired angular position, it is only necessary to tighten the set screw 44 to securely lock the wiper arm to the shaft so as to prevent relative axial movement therebetween to retain the arm in its adjusted angular position.

While the embodiment of the invention as herein disclosed constitutes a preferred form, it is to be understood that other forms might be adopted.

What is claimed is as follows:

1. In a windshield wiper organization, an actuating shaft having a helically knurled head, a wiper arm having a head section with a helically knurled socket recess receiving said knurled head and axially movable relative thereto for varying the angular position between the wiper arm and the shaft, and locking means engageable with said head and said wiper arm for precluding relative axial movement therebetween.

2. In a windshield wiper organization, an actuating shaft having an elongated helically knurled head, a wiper arm having a head section with a complementary helically knurled socket recess receiving said knurled head, the pitch of said helical knurls being such that said wiper arm can be infinitely angularly adjusted within the angle between adjacent knurls upon axial movement of the head section relative to said head, and locking means carried by said head section and engageable with said head for precluding relative axial movement therebetween.

3. In a windshield wiper organization, an actuating shaft, a wiper arm, helical means drivingly interconnecting said wiper arm and said shaft and effecting angular adjustment of the wiper arm relative to the shaft upon axial movement therebetween, and means engageable with said wiper arm and said shaft for precluding axial movement therebetween to retain the arm in its adjusted angular position.

4. In a windshield wiper organization, an actuating shaft, a wiper arm having a section adapted to be telescoped over the end of said shaft, helical means drivingly interconnecting said shaft and said wiper arm section and effecting angular adjustment of the arm relative to the shaft upon relative axial movement therebetween, and locking means carried by said wiper arm section and engageable with said shaft for precluding axial movement therebetween to retain the wiper arm in its adjusted angular position.

5. In a windshield wiper organization, an actuating shaft, an elongate part attached to the outer end of said shaft, a wiper arm having a part telescoping over the elongate shaft part, at least one of said parts having helical means interlocked with the other part thereby establishing a driving connection between the shaft and the wiper arm and enabling angular adjustment of the wiper arm relative to the shaft upon axial movement therebetween, and means engageable with said parts for precluding axial movement therebetween so as to retain the wiper arm in its adjusted angular position.

6. In a windshield wiper organization, an actuating shaft, a wiper arm having a socket recess for receiving said shaft, said socket recess having a threaded opening in its side wall, helical means drivingly connecting said shaft and said wiper arm and enabling angular adjustment of the wiper arm relative to the shaft upon axial movement therebetween, and a locking member having threaded engagement with said opening and engageable with said shaft for locking said wiper arm against axial movement relative to said shaft to retain the wiper arm in its adjusted angular position.

References Cited in the file of this patent

UNITED STATES PATENTS

| 1,381,805 | Crewdson | June 14, 1921 |
| 2,388,089 | Scinta | Oct. 30, 1945 |

FOREIGN PATENTS

| 1,026,098 | France | Jan. 28, 1953 |
| 690,886 | Great Britain | Apr. 29, 1953 |